US005137136A

United States Patent [19]

Humele

[11] Patent Number: 5,137,136

[45] Date of Patent: Aug. 11, 1992

[54] APPARATUS FOR CENTERING AND ALIGNING VESSELS

[75] Inventor: Heinz Humele, Thalmassing, Fed. Rep. of Germany

[73] Assignee: Krones AG, Neutraubling, Fed. Rep. of Germany

[21] Appl. No.: 789,438

[22] Filed: Nov. 6, 1991

Related U.S. Application Data

[63] Continuation of Ser. No. 658,342, Feb. 20, 1991, abandoned.

[30] Foreign Application Priority Data

Feb. 20, 1991 [DE] Fed. Rep. of Germany ..... 40005606

[51] Int. Cl.[5] .......... B65G 47/24

[52] U.S. Cl. .......... 198/379; 198/385; 198/394; 156/DIG. 27; 156/567

[58] Field of Search .......... 198/377, 379, 384, 385, 198/394, 399; 156/DIG. 27, 566, 567, 568

[56] References Cited

U.S. PATENT DOCUMENTS

| | | | |
|---|---|---|---|
| 4,143,754 | 3/1979 | Eldred | 198/394 X |
| 4,280,612 | 7/1981 | Nagano . | |
| 4,594,123 | 6/1986 | Eder | 156/567 X |
| 4,721,544 | 1/1988 | Zodrow et al. | 156/567 X |
| 4,911,285 | 3/1990 | Rogall et al. | 156/567 X |
| 5,004,517 | 4/1991 | Orlandi | 156/567 |

FOREIGN PATENT DOCUMENTS

| | | |
|---|---|---|
| 2419133 | 5/1984 | Fed. Rep. of Germany . |
| 3308489 | 7/1986 | Fed. Rep. of Germany . |

*Primary Examiner*—Joseph E. Valenza
*Assistant Examiner*—Tuan N. Nguyen
*Attorney, Agent, or Firm*—Fuller, Ryan, Hohenfeldt & Kees

[57] ABSTRACT

A device for centering and aligning vessels, such as bottles in a bottle treating machine handles bottles that have bottom and/or sidewall recesses for being engaged by detents or alignment elements in response to swiveling of the bottle where a centering ring of a bottle support is connected through its housing to an auxiliary control arrangement in the bottle transport table while the bottle support plate which is arranged in the housing is supported so as to be freely rotatable and possesses a cylindrical friction rim against which a friction element such as a closed loop belt interfaces for driving the rim rotationally, the friction element extending through the housing of the bottle supporting assembly features a lateral access opening which allows the rim to be engaged during the time that the particular model is in the alignment zone.

8 Claims, 3 Drawing Sheets

APPARATUS FOR CENTERING AND ALIGNING VESSELS

This is a continuation of copending application Ser. No. 07/658,342, filed on Feb. 20, 1991, now abandoned.

BACKGROUND OF THE INVENTION

The invention discloses an apparatus for centering and aligning vessels in preparation for performing an operation on the vessels such as applying a label to them One method of centering bottles in preparation for labeling, for example, requires using a bottle that has a recess in its bottom When the bottle is supported on a plate carried by a rotary bottle transport table, the bottle is rotated until a detent registers with the recess in the bottle to assure that the bottle is centered and aligned in the proper orientation.

German Patent DE-PS 33 08 489 discloses a device that performs this function In the patented device, the vessel is rotated on a support plate until a spring loaded engagement detent aligns with the recess at the bottom of the bottle under the influence of a rotatably supported centering ring which is caused to rotate by means of a friction drive, while the plate that supports the bottom of the bottle is prevented from rotating The inherent disadvantage is that the bottle rotating force that must be transferred from the centering ring to the outer edge of the bottle bottom must be transferred by a relatively small funnel shaped centering surface, opposing the significant frictional force between the bottom of the bottle and the plate on which it is supported. Sometimes the centering surface of the centering ring will slip undesirably past the bottle contour or there can be undesirable slippage between the friction surface and the support ring that bears the centering ring, so that the alignment detent does not always reliably engage in the recess at the bottom of the bottle A further disadvantage of the patented device is that it is not suitable for aligning vessels which have a recess or recesses in the sidewalls of the bottles as well as in the bottom German Patent DE-PS 24 19 133 also discloses a device for aligning cylindrical bottles, wherein the bottles are elevated by a centering cone with a control device as the bottles pass through an alignment zone and are rotated until an alignment cam or detent engages the recess in the bottle This is done either by using a large area friction device acting directly on the bottles or by using a friction wheel connected to the centering cone. In the embodiment first mentioned, problems arise during operation as a result of the presently poor dimensional tolerances of the bottles and their frequently wet surfaces which result in slippage so that alignment is not always accurate. Another disadvantage is that the area on the bottle which is subject to frictional engagement differs with the shape of the bottles so that the friction device must be changed when a bottle style is changed. Use of the device is limited to bottles which have a conical bottom and no centering can take place from the outer contour of the bottom of the bottle The most disadvantageous feature of the device, however, is its size and the space which it occupies resulting from the necessity for vertical control of the centering cone. The size is so great that the device barely fits into the space allowed on the rotating bottle transport table of a modern high capacity labeling machine This is especially true in designs where the centering cone is rotated using an additional friction wheel.

Another alignment and centering device is described in U.S. Pat. No. 4,280,612, particularly FIG. 11, in which rotation required for alignment of the bottle is also accomplished with a friction wheel drive unit This device also cannot be used for labeling or other bottle handling operations using a conventional rotating bottle transport table, but instead requires a bottle table with considerably more elaborate control and gearing mechanisms

SUMMARY OF THE INVENTION

The new conceptually similar bottle centering and alignment devices disclosed herein are distinguished by their simple construction and capability for providing precise centering through the outer contour of a bottle and by reliably aligning bottles that have alignment recesses on the bottom or the sidewall of bottles According to the invention, the centering and aligning assembly is connected to its associated control mechanism in the bottle conveyor which is preferably a bottle transport table in a manner that allows lateral access of a friction drive element so it is possible to undertake the required alignment rotation of the bottle on the table despite the use of the common roller lever-curved cam type control in standard labeling machines by use of a bottle supporting plate that is freely rotatable within the centering and aligning assembly without having to have a complicated and space consuming gear mechanism in the rotary table Instead, rotational movement of the bottle supporting plate is carried out by the friction element, which is vertically arranged in association with the bottle supporting plate in an active alignment zone parallel to the path of the rotary bottle table. The friction element extends through the lateral access opening of the centering and aligning assembly and rests against a frictionally drivable member on which the bottle supporting plate is mounted. The lateral access opening is faced toward the friction drive element and is held in a position that is fixed relative to the rotary table during passage through the alignment and centering zone by means of the control arrangement In an application of the device in a machine wherein the bottles are transported in a circular path, the bottle support plates of the centering and alignment assemblies are arranged on a rotating table whereby it is particularly beneficial that the friction drive element is arranged on the radial outward side of the orbital path of the bottle supporting plates. It is particularly desirable to implement the friction drive element with a flexible friction belt. A flexible belt can be comprised of a closed loop running on guide rollers It is thereby possible to drive the friction belt engaging member, which is integrated with the bottle supporting plate, in the direction in which the centering and aligning assembly is orbiting or, if desired, in the opposite direction. The latter possibility is particularly beneficial, since, in this way the maximum possible number of rotations of the bottle supporting plate for purposes of alignment can be increased during passage through the active alignment zone where it becomes readily possible to completely rotate the vessel a number of times within the alignment distance so that, for example, if there is no engagement of the alignment element or detent during the first rotation of the bottle, the alignment can still be achieved during a second or third rotation Permitting multiple rotations makes it substantially certain that the bottle will be engaged by way of its recesses to properly center and align it.

According to the invention, the design of the bottle supporting plate and the friction surface on it, which is engageable by the friction drive element, is a function of whether a bottle must be aligned by engaging a recess in its bottom or in its sidewall, that is, whether an alignment element such as a cam or detent will be used that acts at the bottle bottom or its sidewall. According to the invention, the alignment element is connected to a bottle centering ring which can rapidly detached from the housing of the centering and aligning assembly. This feature permits, depending on the type of bottle which is to be centered and aligned, the use of either a centering ring with an alignment element or detent on its upper side that is supported so as to be movable radially of the bottle supporting plate or that is supported so as to swivel around an axis which is parallel to the axis of the rotating bottle support plate, or a centering ring with an alignment element on its lower side, in the area of the centering surface, it can be moved axially, parallel to the rotational bottle supporting plate axis or can swivel around a horizontal axis. In the previously mentioned embodiments, the alignment element, which engages a bottle by entering the recess in the bottle, is acted on by a spring in such a way that it is constantly pressed against the bottom of the bottle or against the lateral wall of the bottle during the alignment procedure, until it engages.

If a centering ring is used for engaging the sidewall of a bottle for alignment, then it is desirable to use a bottle supporting plate on the outer peripheral circumference of which there is a cylindrical ring which serves as a friction drivable wheel The outer diameter of the bottle supporting plate can thereby be selected so as to be larger than the inside diameter of the centering surface of the centering ring The bottle supporting plate is supported on an axle journaled in the bore of a control shaft which contains a spring which allows some vertical movement of the axle. When there is no bottle loaded on the bottle supporting plate, its upper side rests against the underside of the centering ring, where the upper stop position, which the bottle supporting plate assumes when the bottles are pushed onto or removed from the transport device, is defined, whereby the bottle supporting plate essentially aligns with the surface of the centering ring. If a centering ring with an alignment element that is suited for bottom alignment is used, then a bottle supporting plate can be used in which the outer diameter is smaller than the inner diameter of the centering surface and, that is, such that the width of the resulting ring gap permits the alignment elements supported on the lower side of the centering ring to extend upward until is reaches through to the bottom of the bottle Under this circumstance, the bottle supporting plate is equipped with a friction surface or pad which consists of a friction, which may be rubber, disk fixedly mounted to the bottle supporting plate and a ring that is fastened onto its circumference or is formed onto it, whereby the inside diameter of the ring is greater than the outer diameter of the bottle supporting plate and the inner diameter of the centering surface, such that the ring of the friction body surrounds the alignment element that is attached to the underside of the centering ring from the outside In this way, the side of the friction body that is in the form of a ring and faces the centering ring cam, together with the centering ring, determine the upper stop position of the bottle support.

Regardless of whether bottles with a recess in the bottom or sidewall are being aligned, according to a further feature of the invention, it can be advantageous for the bottle supporting plate to first be lowered some distance above the axially clamped bottle, from the upper stopped position into an intermediate position between the upper and lower stopped positions by means of the vertical control arrangement for the centering bell, before or during passage through the alignment zone, and not to be lowered into the lowered stop position until after passing through the alignment zone, but before reaching the label application station. This is particularly desirable when the lower stop position of the bottle plate is defined by a stop surface formed on the inside of the housing so that the bottle supporting plate in the lower stopped position interlocks by friction with,,the control arrangement of the centering and aligning assembly through the housing so a part of the torque necessary for carrying out the preprogrammed rotation of the bottle is transferred to the bottle bottom through the bottle supporting plate. This provides the advantage that the torque does not have to be transferred exclusively through the centering surface and the alignment member that is connected to the centering ring In the intermediate position, however, the bottle plate can freely rotate for the alignment of the bottle.

Alternatively, it is also possible to form the lower stopped position of the bottle supporting plate with a surface that is supported so as to be freely rotatable, for which purpose the axial bearing of the said axle of the bottle supporting plate is ideal. In this case, the bottle supporting plate can be brought into its lower stopped position as early as before or during passage through the alignment zone by means of the vertical control of a centering bell, without the occurrence of any hindrance to the ability of the bottle supporting plate to rotate, for the purpose of alignment.

As has been mentioned already, many opportunities for application arise from the fact that the centering ring is connected to the housing of the bottle plate bearing in such a manner that it is rapidly exchangeable. A rapid exchange of the centering ring can be accomplished with a bayonet fitting. To establish and secure the exact rotational position of the centering ring, and thereby the centering area with respect to the bottle support plate, the centering ring can be equipped with a bore hole which, for example, acts in conjunction with a set pin which is spring loaded and is mounted to a plate which extends radially from said control shaft. If the centering ring is removed, then it is sufficient to press the set pin into the ring by means of a detent, rotating the centering ring a few degrees until the bayonet fitting releases it vertically. Then, the centering ring, and if required, the bottle support plate can be removed and be replaced by other useful styles A further feature of the invention is a provision of a depression in the circumferential surface of the centering ring which aligns with a blocking element, connected to the bottle rotary table and rotating along with it, as the centering ring passes an application station such as a labeling station, said blocking element backing up and stabilizing the bottle. A blocking element is arranged with each bottle supporting and aligning assembly and is formed so as to be radially controlled, so that it can be brought in contact with the depression of the centering ring by means of a stationary control cam that is arranged in the area of the application station, with the result that while passing the application station the effect of rotational play existing in the control arrangement is eliminated. This measure ensures precise label placement in relation to the circumferential position on the bottle In order to assure that the adhesive for holding the label is held at a constant level on the bottle, it is particularly desirable to construct the centering ring so as to be vertically movable in relation to the transporter, whereby the centering ring, in its unloaded condition, that is without a bottle on it, is acted upon by a spring and assumes a definite upper limit position, which simultaneously determines the upper stopped position of the bottle supporting plate. The ability of the centering ring to move vertically can be achieved in various ways, for example, by having the housing that supports the centering ring be guided vertically in its entirety on the transporter, or by only having the centering ring be vertically fixed and having another part, together with the centering ring, be movably guided on it.

A particularly simple embodiment of the combination of the centering ring and bottle support plate results in a large lateral access opening can be provided by the use of a drive plate that is fixed on the control shaft that is rotatably supported on the housing of the rotary table. The drive plate having at least three fastened telescoping rods at its outer edge each of which can consist of a pin with a sleeve that is movably guided on it and an integrated pressure spring whereby a stop surface that determines the upper limit position can be formed between the sleeve and the pin. The centering ring can thereby rest on an annular disk which is connected to the ends of the pins which face away from the drive plate.

Another embodiment of the housing has an annular body arranged on the drive plate instead of the telescoping pins, the annular body featuring at least one lateral access opening on its peripheral surface. The annular body is thereby axially displaceable with respect to the drive plate and, in the unloaded state, is held in place at an upper end position by pressure springs. To this end, the annular body features bore holes with integrated pressure springs, into which pins arranged on the drive plate extend. In this embodiment, the centering ring rests directly on the annular body.

The bottle support plate is provided with an axle journal which is supported in a displaceable and rotatable manner in a blind end bore hole of said control shaft that is rotatably supported in the rotary table, the bore having an open top upper and a closed bottom end. The axle that is fixed to the bottle support plate for joint rotation is supported by a compression spring that is arranged above a thrust bearing that is arranged at the bottom closed end of the bore in said control shaft The new device can also be used, with appropriate modification, purely as a centering device for bottle shapes that do not feature any rotationally symmetrical cross-sections and do not need to be aligned. For this application, the annular body and centering ring combination which is like a housing is provided on the inner radial side that is directed toward the bottle plate, with a vertical groove into which, for example, the head of a hexagon head screw is guided so as to be axially displaceable, said hexagon head screw being fastened to the circumference of a corresponding bottle plate. The bottle plate required for this has no friction body, since no alignment is necessary. The centering ring that features a centering surface which corresponds to the vessel cross-section also, for the same reason, has no alignment elements This type of refinement of the device can be utilized, as desired, for sidewall as well as bottom alignment, and for the centering of the bottle bells, whereby the device can readily be built into a bottle transporter of a standard labeling machine How the foregoing objectives and features of the invention are achieved will appear in the ensuing more detailed description of a preferred embodiment of the invention which will now be set forth in reference to the drawings.

DESCRIPTION OF THE DRAWINGS

Referring to FIG. 1, a rotating table 1 is provided for transporting bottles 3 along a circular path. The bottles come in on a flat conveyor belt 50 and are engaged by a screw conveyor which feeds the bottles 3 into the pockets of an inlet star wheel 51. Alignment and centering of the bottles to prepare them for being processed such as for having a label applied begins immediately after the bottles are placed on the rotating table and is completed by the time orbits through an alignment zone 18. The length of the alignment zone is determined by the curved section of a friction element in the form of a belt 13 that is arranged on the radially outward side of the rotating transport table 1. The bottles are carried on the rotating table by means of a bottle support and alignment assembly 2. Friction with belt 13 results in rotation of the bottles to engage a small recess in them with an orientating detent as will be elaborated Immediately after the bottles have been pushed onto the bottle support assembly 2 by the infeed star wheel 51, the associated centering bell 15, depicted in FIGURE 2, is lowered by means of the vertical control 14, so that the bottle 3 is clamped with an axially applied force. The centering bell is carried on a stem 60 and is slidable within a blind ended sleeve 62 which is movable downwardly for driving stem 60 downwardly with a force conducted through a coil spring 63. Stem 60 can move vertically to a limited extent set by a pin 64 extending through a slot 65 in sleeve 62 The sleeve is carried on the shaft of a cam follower roller 66 which follows a cam groove 67 in a stationary cam support 68 As is self evident, when the sleeve 62 is driven orbitally, it is caused to reciprocate by the action of cam follower roller 66 for engaging the bell 15 with the mouth end of the bottle 3 to force the bottle downwardly to various levels as will be elaborated Alignment of the bottles occurs while they are passing through the alignment zone 18 and well in advance of their arrival at a processing station 52 which is a bottle labeler in this particular example. The labeler includes a glue roller 70, a wheel 71 on which there are several swingable pallets 72 to which a coating of glue is applied as they pass the roller 70. As the pallets arrive at a label dispenser magazine 73 they pick up a label which is carried to stripper 74 and results in the glued size of the label being exposed for being pressed onto containers 3 as they follow the orbital path defined by the rotating table 1 on which the bottles are transported.

Figure 1:
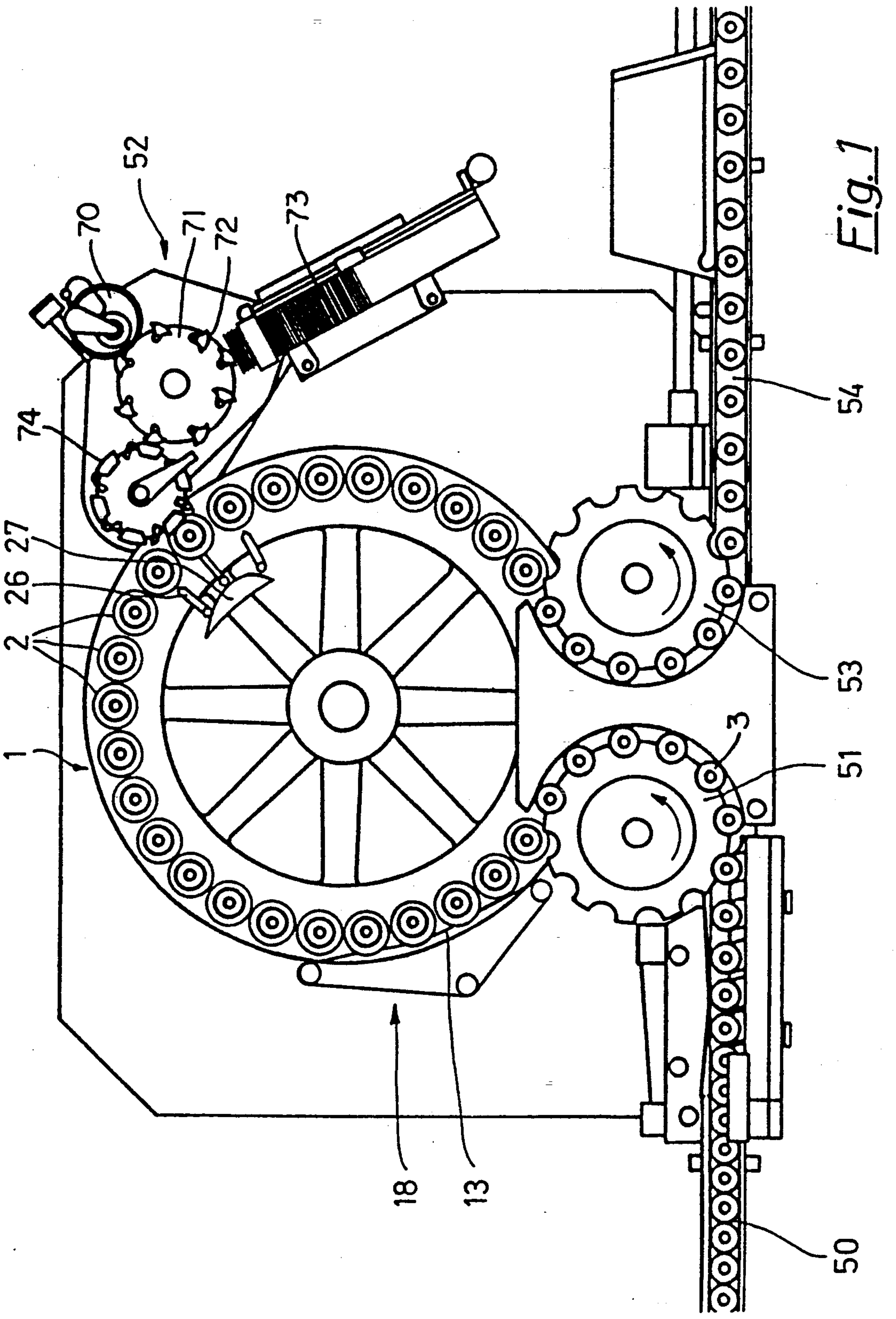
FIG. 1 is a schematic top plan view of the rotating table of a bottle processing machine, such as a labeling machine which employs the new alignment device, with its upper part removed.

After the label is applied and while the bottle is rotating, it is brushed to conform the label to the contour of the bottle. Just prior to reaching the outlet star wheel 53, the centering bell 15 is raised from the mouth of the bottle 3 by means of vertical control 14 so the bottle can be transferred onto the outlet conveyor 54 by the rotating transport table 1.

As shown in FIG. 1, a controllable blocking member 26 that rotates along with transport table 1 can be arranged with each bottle support and alignment assembly 2, the blocking member can be radially displaceable at the label application station 52 in the direction of the bottle by means of stationary cam 27 and can be brought into contact with a recess on the circumference of the centering ring 12. This assures that the bottle is stabilized while the label is being applied at the application station 52. Only the blocking members 26, which are similar to cam followers, are shown in the area 52 to provide a better overview.

Figure 2:
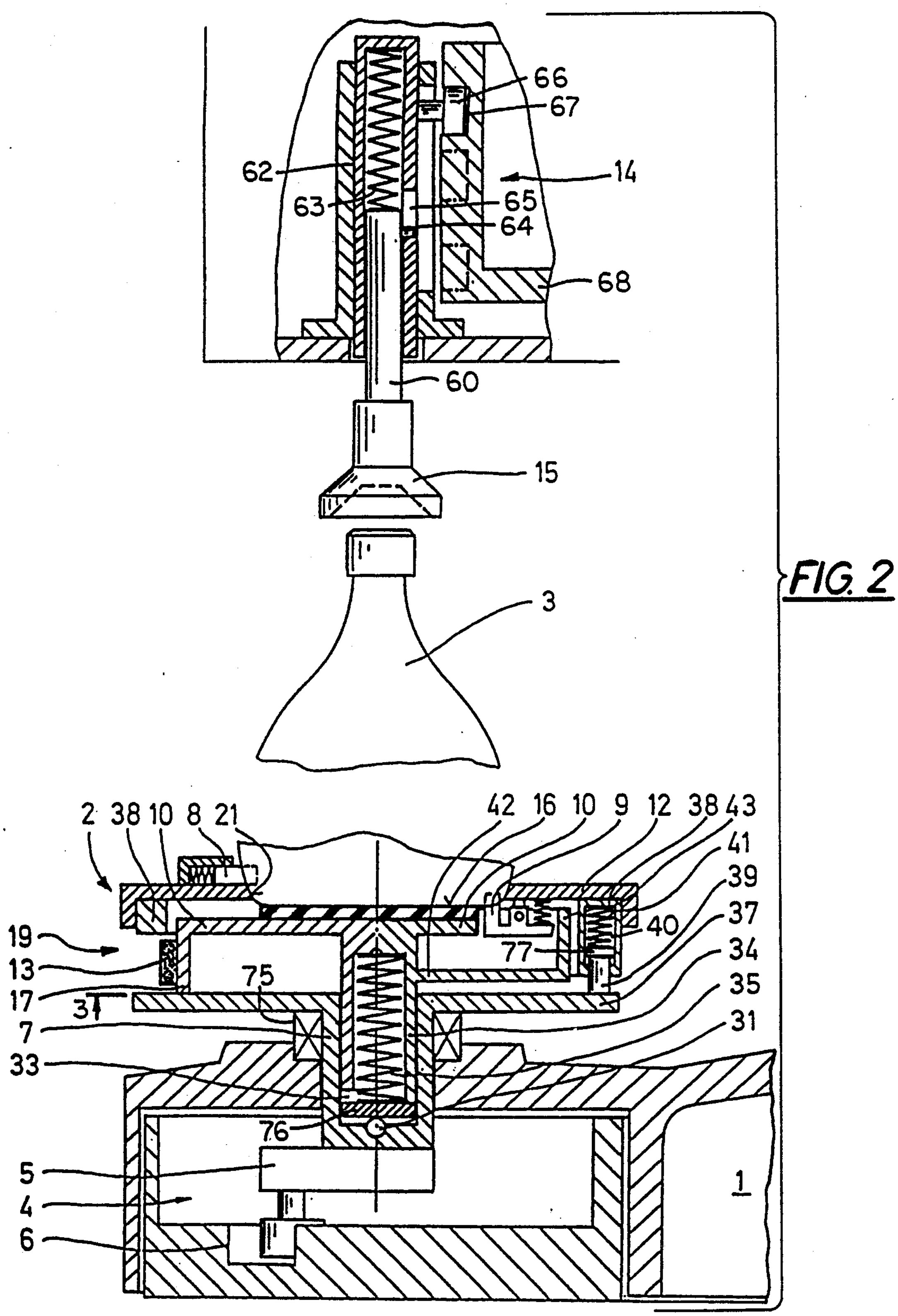
FIG. 2 is a vertical section through the centering and alignment device, whereby the left half of the bottle support represents an embodiment for aligning a bottle by using a recess in its sidewall and the right half for aligning where the recess is in the bottom of the bottle.
Figure 4:
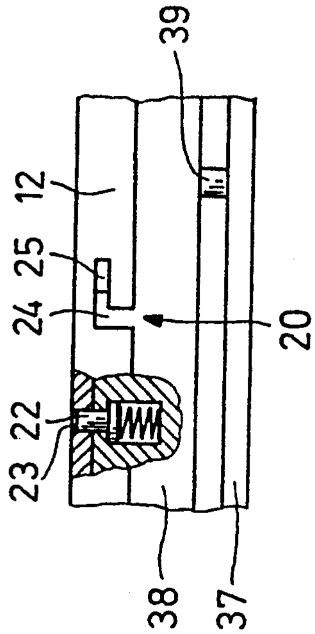
FIG. 4 is a side elevational view of a portion of the peripheral surface of the bottle supporting plate, partially in section.

In FIG. 2, the rotating bottle transport table 1 is shown with the means for actuating the centering and aligning assembly 2. The operating mechanism includes a stationary cam groove 6 around which the table 1 rotates. A cam follower lever 5 is connected to a control shaft 7 which is joined with cam follower lever 5 Control shaft 7 is rotatable in a bearing 75 which is mounted in the rotating table 1 and control shaft 7 is not movable vertically The control shaft has an axial bore that is closed at the bottom and opens upwardly. A hard metal disk 76 is in the control shaft and it bears on a thrust bearing in the form of a ball 31. A hollow axle 34 rests on the bearing and is occupied by a compression spring 35. Axle 34 extends integrally from the bottom of bottle support plate 10. Axle 34, and hence, bottle support plate 10 are supported so as to be displaceable axially through small increments in the bore 33 of control shaft 7. A drive plate 37 is also fixed on control shaft 7 for rotating with the control shaft. Drive plate 37 cannot move vertically. There are pins 39 extending vertically upwardly from drive plate 37. The pins 39 extend into bores 40 on the ring body 38. The bores 40 respectively include a compression spring 41. The pins possess a head 77 which fixes the upper limit position of the ring body 38 when it is not loaded with a bottle The ring body 38 supports a centering ring 12. The centering ring 12 is rigidly locked to the ring body 38 by means of a bayonet connector 20 which is illustrated in FIG. 4. The bayonet connector 20 comprises a lug 25 that is formed on the annular body 38, and an L-shaped slot 24 on the edge of the centering ring 12.

The left half of FIG. 2, constituting one embodiment of the invention, illustrates a spring loaded alignment element or detent 8 supported on a centering ring 12 so as to be displaceable radially for registering in a recess in the sidewall of a bottle, while in the right half of the FIG. 2 embodiment, the centering ring 12 is illustrated with an alignment element or detent 9 that is swingable about a horizontal axis supported on the underside of the centering ring for engaging in a recess which is formed in the bottom of the bottle On the left side of the device in FIG. 2, underneath the outer edge of the centering ring 12, there is a lateral access opening 19 formed in the annular body 38, which, together with the drive plate 37 and the centering ring 12 forms the housing of the centering and aligning assembly 2 that surrounds the bottle support plate 10. A friction element in the form of a flexible closed loop belt 13 extends through lateral opening 19 when the bottle aligning assembly is in the zone 18 and bears against the surface of the annular friction drive rim 17 of the bottle support plate 10. The rim 17 serves as a friction drive surface which is engaged by the belt as the rim 17 is carried in an orbital path by rotating table 1. This is a continuous annular rim 17 as can be seen on both the left and right sides of FIG. 2. In FIG. 2 the bottle support plate 10 is in its lowermost limit position which it reaches at the latest before passing the application station 52.

In the left half of FIG. 2, the lower limit position of bottle support plate 10 is determined by the friction rim 17 becoming lowered to become frictionally engaged with the top side of drive plate 37. In this embodiment, after the bottle 3 has been pushed onto the bottle plate surface 16 of bottle support plate 10, the bottle support plate 10 is lowered a small distance from the upper limit position which is defined by the upper side of the bottle support plate 10 and the underside of the centering ring 12 into a new intermediate position which permits free rotation of bottle plate 10 by means of the belt 13 until an engagement of the alignment elements 8 occur. After the detent or alignment elements 8 register in the sidewall recess, there is slippage between the friction belt 13 and the friction drive rim 17 until the bottle support under consideration has completed its passage through the alignment zone 18 which is identified in FIG. 1. Upon reaching the end of the alignment zone 18, the centering bell 15 with its bottle 3 is lowered to the lower limit position of the bottle support plate 10 by means of vertical control 14 so that this engages by friction with the drive plate 37. The intermediate and limit position of the vertical control device 14 is indicated in the upper part of FIGURE 2.

The upper side of bottle support plate 10 has a replaceable disk 16 on which the bottle 3 is supported. The disk can have a gripping quality or can be smooth, depending on the requirements.

In the right half of FIG. 2, one may see that the outside diameter of the bottle support plate 10 must be smaller than the inside diameter of the edge 21 on the centering ring 12 for the bottle to fit and rest on the supporting plate 10. The alignment detent 9 that acts on the vessel bottom extends through a gap between the bottle support plate 10 and the centering ring The alignment element 9 is provided with a stop which prevents element 9 from projecting over the surface of centering ring 12 when the ring is in unloaded condition. If the bottle bottom is now lowered by means of vertical control 14 into the lower limit position of bottle support plate 10, which is defined by the lower end of the axle journal 34 and the axial bearing 31 and a hard metal disk 76, then the alignment element or detent 9 is pressed downwardly but, as a result of spring loading, always comes to rest at the bottom of the vessel until it can engage in a recess in the bottle. In this version where the bottom alignment is carried out, the friction body 17 is composed of a disk 42 which is fastened to the axle 34 under the bottle support plate 10 at some distance from it and creates a ring or rim 43 The inside diameter of rim 43 is greater than the inside diameter of the centering surface 21 and the outer diameter of the bottle support plate 10.

Figure 3:
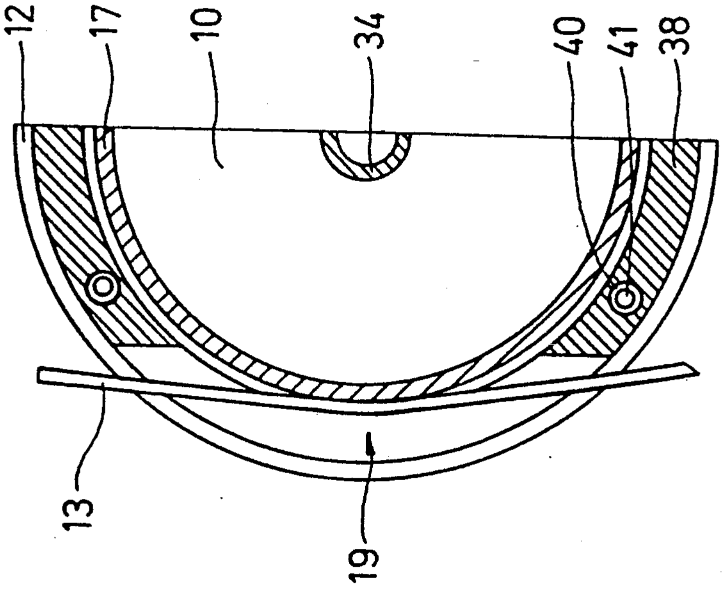
FIG. 3 is a horizontal section taken on a line marked 3 and extending to the center of the device.

The side access opening 19 in the housing of the centering and aligning assembly 2 can be readily seen in horizontal sections shown from below in FIG. 3 and through the embodiment of the centering and aligning assembly 2 for sidewall alignment as shown on the left side in FIGURE 2, the side access opening 19 being at the circumference of the ring body 38. Access opening 19 makes is possible for the friction belt to make contact with the friction drive rim 17 which is concentrically arranged in the housing of the bottle support plate 10.

I claim:

1. A device for aligning bottles in a predetermined angular orientation as the bottles are transported to a work station at which an operation such as labeling or printing on the bottles is performed, said bottles having an alignment recess formed thereon, comprising:

a rotary table (1) on which at least one of said devices (2) for aligning bottles is mounted for being transported to said station (52) by rotating said table about a vertical axis, a stationary cam (6) extending along the movement path of said device on the rotary table, the device including a vertically arranged cam driven control shaft (7) mounted for turning about a vertical axis radially spaced from the rotational axis of said table, cam follower means (4, 5) operatively coupling said shaft to said cam (6), a bottle support plate (10) disposed coaxially to said control shaft (7) and a friction ring (17, 41) connected to said support plate and positioned above table (1) for being frictionally engaged to rotate the bottle support plate, a centering ring (12) arranged over said bottle support plate (10), said centering ring having an opening through which the bottom of a bottle can extend for resting on said bottle support plate, a spring loaded detent element (8, 9) mounted to said centering ring (12) in a position for registering in said alignment recess of said bottle in response to rotation of said bottle support plate (10) to thereby hold said bottle in a predetermined rotational position, a friction member (13) positioned adjacent said rotary table within a bottle alignment zone for frictionally engaging said friction ring (17, 41) to rotate said axle shaft and the bottle support plate thereon to bring said recess on the bottle into registry with a detent (8, 9).

2. The device according to claim 1 wherein said friction member comprises a belt (13) which slips on said friction ring (17, 41) when said detent registers in a recess.

3. The device according to claim 2 wherein said belt is of sufficient length to remain in frictional driving relation with said friction ring long enough for said bottle to make more than one revolution if said recess in the bottle is not engaged by a detent on the first revolution.

4. The device according to any one of claims 1, 2 or 3 including a centering bell means arranged for engaging the mouth of the bottle after said bottle is on a device on said rotary table and actuating means (14) for actuating said centering bell such that said centering bell applies various amounts of force on said bottle as said bottle is transported by said rotary table and the force applied to said bottle when in said alignment zone comprises said spring (35) acting on said axle shaft (34) a sufficient amount for said bottle support plate (10) to descend to an intermediate vertical position in which said support plate can rotate freely with a bottle thereon in response to being driven by said friction member (13).

5. The device according to claim 4 including a drive plate (37) fixed to said control shaft (7) and extending radially outwardly of said control shaft, said actuating means (14) for said centering bell (15) causing said friction ring (17) to descend further after said recess has been engaged to thereby place said friction ring in frictional engagement with said drive plate (37), and a drive element (39) fixed on said drive plate (37) slidably engaged with said centering plate (12), said stationary cam (6) having a configuration in the vicinity of said work station for swinging said cam follower means (5) to effect rotation of said control shaft (7) and drive plate (37) so said drive element (39) turns said bottle, said centering ring (12) and said bottle support plate (10) jointly in the vicinity of said work station.

6. The device according to claim 1 including means for detachably interlocking said bottle support plate (10) and said centering ring 12.

7. The device according to claim 1 or 2 including a drive plate (37) fixed to said control shaft (7) and extending radially outwardly of said control shaft, said drive plate (37) carrying said centering plate (12) being axial slidably engaged with said drive plate (37), said bottle support plate (10) and said friction ring (17, 41) being situated above the drive plate (37) and underneath the centering plate (12), and comprising a lateral access opening (19) between the centering plate (12) and the drive plate (37), through which said friction member (13) for frictionally engaging said friction ring (17, 41) extends when the centering and aligning assembly (2) passes said bottle alignment zone (18).

8. The device according to claim 7 wherein said lateral access opening (19) is faced toward said friction member (13) and is held in a position that is fixed relative to said rotary table (1) during passage through said bottle alignment zone (18).

* * * * *

UNITED STATES PATENT AND TRADEMARK OFFICE

CERTIFICATE OF CORRECTION

PATENT NO. : 5,137,136

DATED : August 11, 1992

INVENTOR(S) : Heinz Humele

It is certified that error appears in the above-indentified patent and that said Letters Patent is hereby corrected as shown below:

Column 10, line 13:

Before "spring" delete "said" and substitute --- a ---.
After "on" delete "said axle shaft (34) and substitute --- said bottle support plate ---.

Signed and Sealed this

Twelfth Day of October, 1993

*Attest:*

Bruce Lehman

BRUCE LEHMAN

*Attesting Officer* *Commissioner of Patents and Trademarks*